United States Patent
Rovison et al.

(10) Patent No.: US 11,414,329 B2
(45) Date of Patent: Aug. 16, 2022

(54) TREATMENT OF CYANOTOXIN-CONTAINING WATER

(71) Applicant: EVONIK OPERATIONS GMBH, Essen (DE)

(72) Inventors: John M. Rovison, Sanborn, NY (US); Weidong An, Williamsville, NY (US); Ian Horner, Kenmore, NY (US); Brianna Desjardins, Boston, NY (US)

(73) Assignee: Evonik Operations GmbH, Essen (DE)

( * ) Notice: Subject to any disclaimer, the term of this patent is extended or adjusted under 35 U.S.C. 154(b) by 282 days.

(21) Appl. No.: 16/275,894

(22) Filed: Feb. 14, 2019

(65) Prior Publication Data
US 2019/0248679 A1    Aug. 15, 2019

Related U.S. Application Data

(60) Provisional application No. 62/630,433, filed on Feb. 14, 2018.

(51) Int. Cl.
*C02F 1/467*    (2006.01)
*C02F 1/461*    (2006.01)
(Continued)

(52) U.S. Cl.
CPC ........ *C02F 1/4672* (2013.01); *C02F 1/46109* (2013.01); *C02F 2001/46133* (2013.01);
(Continued)

(58) Field of Classification Search
CPC ....... C02F 1/467; C02F 1/4672; C02F 1/4674
See application file for complete search history.

(56) References Cited

U.S. PATENT DOCUMENTS 4,029,557 A * 6/1977 Christensen .............. C02F 9/00
                                                        210/748.2
5,439,663 A   8/1995 Manganaro et al.
(Continued)

FOREIGN PATENT DOCUMENTS

CN    101 962 216         2/2011
CN    101962216 A  *      2/2011
(Continued)

OTHER PUBLICATIONS

Rodriguez et al, "Oxidative Elimination of Cyanotoxins: Comparison of Ozone, Chlorine, Chlorine Dioxide and Permanganate," Water Research, 41 (2007) 3381-3393 (Year: 2007).*
(Continued)

*Primary Examiner* — Salil Jain
(74) *Attorney, Agent, or Firm* — Law Office of Michael A. Sanzo, LLC

(57) ABSTRACT

Provided herein are methods and compositions for reducing the level of a cyanotoxin in cyanotoxin contaminated-water. The electrolytic destruction methods can include contacting the contaminated water with an electrochemical cell in the presence of a magnesium salt and applying an electrical current to the water for a time and in an amount sufficient to oxidize the cyanotoxin. The methods are useful for treatment of lake water, reservoir water, pond water, river water, or irrigation water and any water that serves as a source of drinking water.

20 Claims, 2 Drawing Sheets

A – boron-doped diamond electrode serving as anode; C – boron-doped diamond electrode serving as cathode;

(51) Int. Cl.
*C02F 101/38* (2006.01)
*C02F 101/36* (2006.01)
*C02F 103/00* (2006.01)
*C02F 101/34* (2006.01)
*C02F 101/30* (2006.01)

(52) U.S. Cl.
CPC ............... *C02F 2001/46147* (2013.01); *C02F 2101/30* (2013.01); *C02F 2101/34* (2013.01); *C02F 2101/36* (2013.01); *C02F 2101/38* (2013.01); *C02F 2103/007* (2013.01); *C02F 2201/4615* (2013.01)

(56) References Cited

U.S. PATENT DOCUMENTS

| | | |
|---|---|---|
| 5,632,676 A | 5/1997 | Kurschner et al. |
| 5,660,712 A * | 8/1997 | Carus, III ......... C01G 45/1214 205/476 |
| 5,849,985 A | 12/1998 | Tieckelmann et al. |
| 5,879,653 A | 3/1999 | Castrantas et al. |
| 5,977,403 A | 11/1999 | Byers |
| 6,365,099 B1 | 4/2002 | Castrantas et al. |
| 6,828,294 B2 | 12/2004 | Kellar et al. |
| 7,347,647 B2 | 3/2008 | Seech et al. |
| 7,416,718 B2 | 8/2008 | Sethi et al. |
| 7,473,372 B2 | 1/2009 | Block et al. |
| 7,510,721 B2 | 3/2009 | Roden et al. |
| 7,524,141 B2 | 4/2009 | Sethi et al. |
| 7,547,430 B2 | 6/2009 | Sethi et al. |
| 7,576,254 B2 | 8/2009 | Block et al. |
| 7,666,315 B2 | 2/2010 | Lopez Martinez et al. |
| 7,785,038 B2 | 8/2010 | Block et al. |
| 7,947,745 B1 | 5/2011 | Laramay et al. |
| 7,998,446 B2 | 8/2011 | Pfeffer et al. |
| 8,029,693 B2 | 10/2011 | Dada et al. |
| 8,454,890 B2 | 6/2013 | Rovison, Jr. et al. |
| 8,486,366 B2 | 7/2013 | Pfeffer et al. |
| 8,575,075 B2 | 11/2013 | Huang et al. |
| 8,597,507 B2 * | 12/2013 | Korzeniowski ........... C02F 1/78 210/188 |
| 8,877,149 B2 | 11/2014 | Pfeffer et al. |
| 9,005,669 B2 | 4/2015 | Allen et al. |
| 9,018,142 B2 | 4/2015 | Rovison, Jr. et al. |
| 9,114,357 B2 | 8/2015 | Block et al. |
| 9,295,744 B2 | 3/2016 | Rovison et al. |
| 9,351,488 B2 | 5/2016 | Rovison et al. |
| 9,375,768 B2 | 6/2016 | Pisanova et al. |
| 9,551,162 B2 * | 1/2017 | Palmer ................. E04H 4/1209 |
| 9,656,890 B2 | 5/2017 | Block |
| 9,821,353 B2 | 11/2017 | Pisanova et al. |
| 9,849,203 B2 | 12/2017 | Rovison, Jr. et al. |
| 10,344,199 B2 | 7/2019 | Pisanova et al. |
| 10,625,655 B2 | 4/2020 | Rovison, Jr. et al. |
| 2008/0116142 A1* | 5/2008 | Fischmann Torres .. E02F 3/885 210/712 |
| 2008/0226541 A1 | 9/2008 | Zhou et al. |
| 2014/0228328 A1 | 8/2014 | Rovison et al. |
| 2015/0005379 A1 | 1/2015 | Block et al. |
| 2015/0034566 A1 | 2/2015 | Karpova et al. |
| 2015/0141301 A1 | 5/2015 | Rovison, Jr. et al. |
| 2015/0218437 A1 | 8/2015 | Rovison, Jr. et al. |
| 2015/0239738 A1 | 8/2015 | Zhou et al. |
| 2015/0258589 A1 | 9/2015 | Seech |
| 2016/0264433 A1* | 9/2016 | Hong .................... C02F 1/4672 |
| 2016/0345576 A1 | 12/2016 | Rovison et al. |
| 2017/0313604 A1 | 11/2017 | Garibi et al. |
| 2018/0065874 A1 | 3/2018 | Au et al. |
| 2018/0103638 A1 | 4/2018 | Puente de Vera et al. |
| 2018/0117198 A1 | 5/2018 | Rovison, Jr. et al. |
| 2018/0271090 A1 | 9/2018 | Rovison et al. |
| 2018/0360060 A1 | 12/2018 | Pisanova et al. |
| 2019/0144313 A1 | 5/2019 | Block et al. |
| 2019/0152817 A1 | 5/2019 | Block et al. |
| 2019/0364892 A1 | 12/2019 | An et al. |
| 2019/0380337 A1 | 12/2019 | Mittiga et al. |
| 2019/0388574 A1 | 12/2019 | An et al. |
| 2020/0238887 A1 | 7/2020 | Rovison, Jr. et al. |
| 2020/0352165 A1 | 11/2020 | Puente de Vera et al. |

FOREIGN PATENT DOCUMENTS

| | | | |
|---|---|---|---|
| JP | 08-257591 | 10/1996 | |
| KR | 10-2004-0070408 | 8/2004 | |
| WO | 90/15025 | 12/1990 | |
| WO | WO-2004055243 A1 * | 7/2004 | ............ C25B 1/28 |
| WO | WO 2013/115732 | 8/2013 | |
| WO | WO-2013115732 A2 * | 8/2013 | ............ C02F 1/02 |

OTHER PUBLICATIONS

Rodriguez, Eva et al., "Oxidative elimination of cyanotoxins: Comparison of ozone, chlorine, chlorine dioxide and permanganate", Water Research, Jun. 20, 2007, vol. 41, No. 15, pp. 3381-3393.
International Search Report and Written Opinion dated May 17, 2019 in corresponding PCT Application No. PCT/US2019/018006.
International Preliminary Report on Patentability for corresponding PCT application PCT/US2019/018006 filed Feb. 14, 2019.
U.S. Appl. No. 16/009,936, filed Jun. 15, 2018, US-2018-0360060 A1, Dec. 20, 2018, Pisanova.
U.S. Appl. No. 16/191,757, filed Nov. 15, 2018, US-2019/0144313 A1, May 16, 2019, Block.
U.S. Appl. No. 16/194,559, filed Nov. 19, 2018, US-2019-0152817 A1, May 23, 2019, Block.
U.S. Appl. No. 16/428,216, filed May 31, 2019, US-2019-0364892 A1, Dec. 5, 2019, An.
U.S. Appl. No. 16/448,542, filed Jun. 21, 2019, US-2019-0388574 A1, Dec. 26, 2019, An.
U.S. Appl. No. 16/777,057, filed Jan. 30, 2020, US-2020-0238887 A1, Jul. 30, 2020, Rovison.
U.S. Appl. No. 16/936,663, filed Jul. 23, 2020, US-2020-0352165 A1, Nov. 12, 2020, Puente de Vera.
U.S. Appl. No. 17/253,953, filed Dec. 18, 2020, Mittiga.
Supplementary European Search Report and Search Opinion for corresponding EP 19 75 4067, filed on Feb. 14, 2019.
Kim, et al., "Oxidation of microcystin-LR by Fe(II)-tetrapolyphosphate in the presence of oxygen: Effect of calcium and magnesium ion," Database Biosis [Online]; Biosciences Information Service, Philadelphia PA, (Aug. 2016).

* cited by examiner

Figure 1. Microcystin Destruction rates

A – boron-doped diamond electrode serving as anode; C – boron-doped diamond electrode serving as cathode;

TREATMENT OF CYANOTOXIN-CONTAINING WATER

CROSS-REFERENCE TO RELATED APPLICATIONS

This application claims priority under 35 U.S.C. § 119(e)(1) from U.S. Provisional Application Ser. No. 62/630,433, filed on Feb. 14, 2018, the contents of which are incorporated herein by reference.

FIELD OF THE INVENTION

The present invention relates to a method of treating cyanotoxin-containing water, for example, lake water, by electrochemical oxidation in the presence of a magnesium salt.

BACKGROUND OF THE INVENTION

Cyanobacteria, also known as blue-green algae, are found in both fresh and salt water. Under certain conditions, for example, in the presence of high levels of agricultural fertilizer run-off for in coastal upwelling zones, cyanobacteria can proliferate exponentially to form "algae blooms." Cyanobacteria can produce cyanotoxins which are released upon cell death or lysis. Cyanotoxins are powerful toxins that are harmful to animals that live in and/or consume the water. Cyanotoxins have been implicated in the deaths of fish, water fowl, marine mammals, and agricultural animals that have consumed cyanotoxin-containing water. Cyanotoxins are also harmful to humans. Cyanotoxins cause liver toxicity, kidney damage, and neurotoxicity. For municipalities that derive their drinking water from sources that are subject to algal blooms, the presence of cyanotoxins in the water source poses a significant public health problem. Cyanotoxins are relatively stable compounds and can persist in water for several months. Conventional methods of water treatment, such chlorination, membrane filtration, ultraviolet disinfection, or ozonation, are not always effective for rapid cyanotoxin removal. There is a continuing need for efficient and cost-effective methods of cyanotoxin removal from water.

SUMMARY OF THE INVENTION

Provided herein are methods of reducing the level of a cyanotoxin in cyanotoxin-contaminated water. The method can include the steps of contacting the water with an electrochemical cell in the presence of a magnesium salt and applying an electrical current to the water at a current density and for a time sufficient to oxidize the cyanotoxin. Cyanotoxins can include microcystins, nodularins, anatoxin-a, anatoxin-a(S), cylindrospermopsins, lyngbyatoxin, saxitoxin, lipopolysaccharides, aplysiatoxins, and β-methyl-amino-L-alanine. In some embodiments, the microcystin can be microcystin-LR, microcystin-LA, microcystin-RR, microcystin-YR or a combination thereof. The water can include lake water, reservoir water, pond water, river water, or irrigation water and can be a source of drinking water. The electrochemical cell can be an undivided cell. The undivided cell can include one or more boron-doped diamond electrodes. The magnesium salt can include magnesium sulfate, magnesium chloride, magnesium phosphate, magnesium carbonate, magnesium bicarbonate, and magnesium citrate. In some embodiments, the concentration of the magnesium salt is from about 1 ppm to about 1000 ppm. In some embodiments, the current density is from about 0.5 mA/cm² to about 1000 mA/cm².

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts and further wherein.

DETAILED DESCRIPTION

Figure 1:
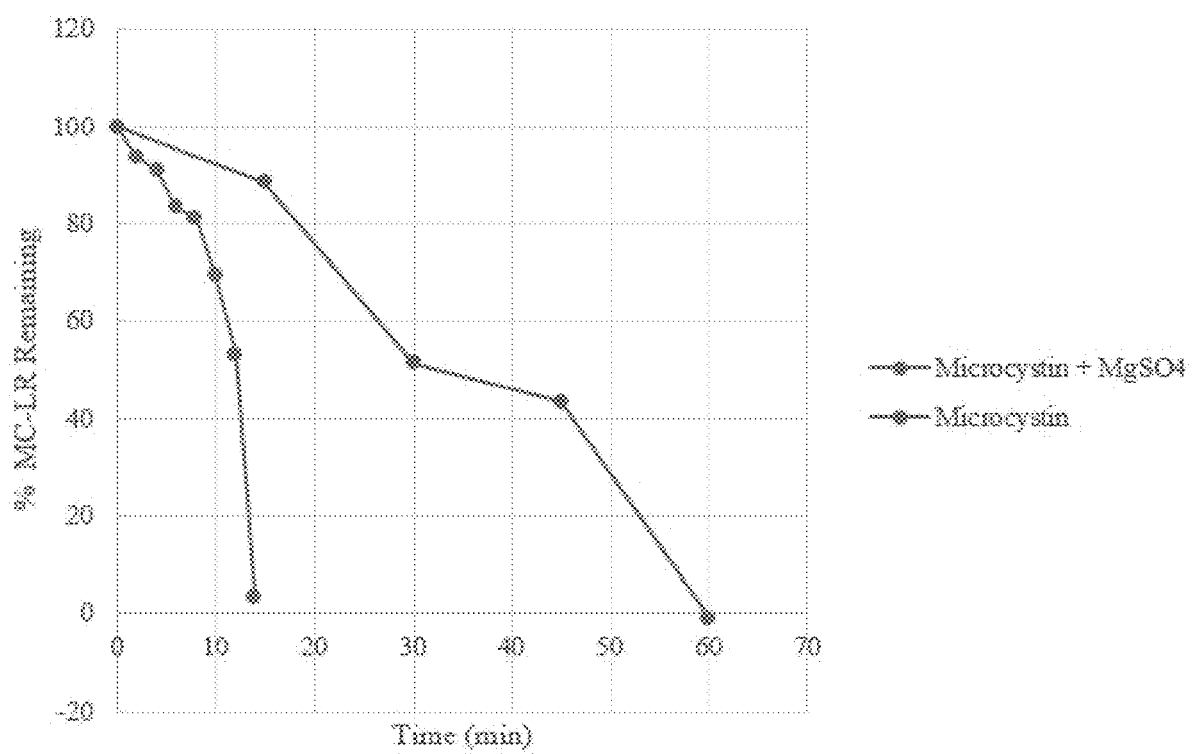
FIG. 1 is a graph showing the destruction rate of microcystin (MC-LR) by electrolytic oxidation in the presence and absence of $MgSO_4$.
Figure 2:
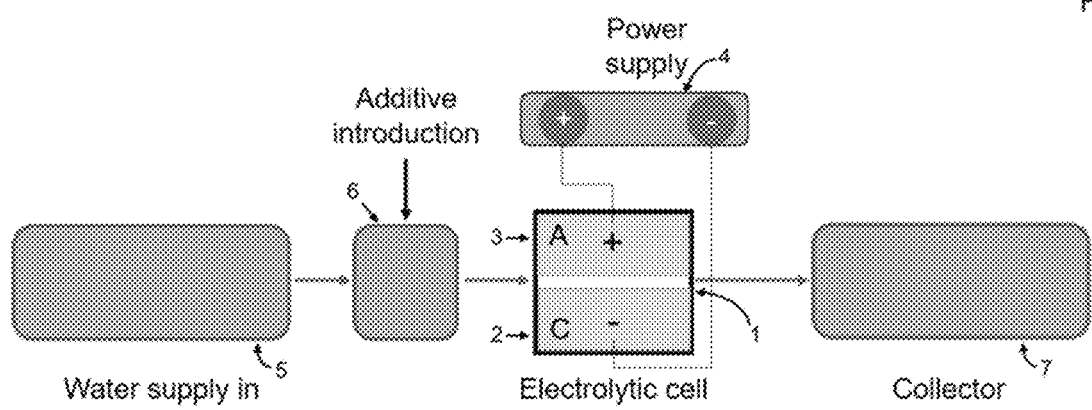
FIG. 2 is a schematic illustrating one embodiment of the water treatment system.

Algal blooms, which result in relatively high concentrations of cyanotoxins, have been reported in many locations including the U.S. Great Lakes, Monterey Bay in California, and many locations worldwide, including Europe, Australia, Brazil, China, and South Africa. In the Great Lakes, algal blooms have occurred on the western shallow end of Lake Erie. In the traditional seasonal thermocline cycle, cold winter temperatures allow for oxygen rich water to sink and force up oxygen depleted waters for rejuvenation. With the more recently occurring mild winters, such turn-over is interrupted and eutrophication can occur at an accelerated rate, resulting in a stagnating layering of water. In addition, increased agricultural run-off and increasingly warmer surface waters have fostered an environment in which blue-green algae can proliferate in mid to late summer.

Many U.S. cities that source their water from the Great Lakes have instituted warning criteria for water consumption during algae blooms when cyanotoxin levels are elevated. For example, drinking water thresholds for cyanotoxins in Ohio are listed in Table 1.

TABLE 1

| | Ohio EPA Cyanotoxin Thresholds for Drinking Water | | | |
|---|---|---|---|---|
| Drinking Water Thresholds | Microcystins** (μg/L) | Anatoxin-a (μg/L) | Clyindrospermopsin (μg/L) | Saxitoxins** (μg/L) |
| Do Not Drink - children under 6 and sensitive populations | 0.3 | 20 | 0.7 | 0.3 |

TABLE 1-continued

Ohio EPA Cyanotoxin Thresholds for Drinking Water

| Drinking Water Thresholds | Microcystins** (μg/L) | Anatoxin-a (μg/L) | Clyindrospermopsin (μg/L) | Saxitoxins** (μg/L) |
|---|---|---|---|---|
| Do Not Drink - children 6 and older and adults | 1.6 | 20 | 3.0 | 1.6 |
| Do Not Use* | 20 | 300 | 20 | 3 |

Source: 2017 Ohio PWS HAB Response Strategy
*The Drinking Water 'Do Not Use' thresholds are based on the Recreational No Contact Advisory thresholds.
**Microcystins and saxitoxins thresholds are intended to be applied to total concentrations of all reported congeners/variants of those cyanotoxins.

Typical methods of water treatment can be ineffective for removal of cyanotoxins. Physical separation methods can be inefficient and do not result in cyanotoxin destruction. Oxidation methods, for example chlorination, may not be effective against some species under commonly used conditions. Chlorination can also result in the production of toxic byproducts produced by the reaction of chlorine with natural organic matter in the water. Chlorination can have a negative impact on water taste and odor. The volatility of chlorine can also decrease its effectiveness over time. Alternatives to chlorination such as permanganate, membrane filtration and UV disinfection require high technical expertise and typically have higher operating and maintenance costs. Ozonation can be costly, requiring corrosion resistant materials, and power intensive. Ozone can also be irritating and toxic.

Provided herein are methods of reducing cyanotoxin levels in water by electrolytic oxidation in the presence of a magnesium salt. The inventors have found that treatment of cyanotoxin-contaminated water with an electric current in the presence of a magnesium salt resulted in cyanotoxin oxidation. The method can include the steps of contacting the water with an electrochemical cell comprising a boron-doped diamond electrode in the presence of the magnesium salt and applying an electric current to the water at a current density and for a time sufficient to oxidize the cyanotoxin. The electrochemical cell can be an undivided cell. Such electrolytic oxidation, also referred to as electrochemical oxidation, provided a substantial reduction of cyanotoxin concentration in a relatively short time period. The inventors have found surprisingly that magnesium salts enhanced the destruction of cyanotoxins while at the same time, the high solubility of magnesium salts mitigated salt deposition inside the operating cells and avoided increased salinity associated with other electrolytes. The methods disclosed herein are generally useful for the treatment of contaminated water, that is, cyanotoxin-containing water. The cyanotoxin-containing water can be, for example, lake water, reservoir water, pond water, river water, or irrigation water. The cyanotoxin-containing water can be water that serves as a source of drinking water and has become contaminated with unsafe levels of cyanotoxins. The method can be used to treat incoming contaminated water before the water enters into the standard water treatment process.

Cyanotoxins are produced by a variety of genera of cyanobacteria. Cyanotoxins encompass several structural classes including, for example, cyclic peptides, alkaloids, polyketides, and amino acids. Exemplary cyclic peptides include the microcystins. Microcystins are cyclic non-ribosomal heptapeptides. Microcystins contain two protein amino acids and four non-protein amino acids in a ring structure. Microcystins are named based on the protein amino acids in the ring structure. For example, microcystin-LR (5R,8S,11R,12S,15S,18S,19S,22R)-15-[3-(diaminomethylideneamino)propyl]-18-[(1E,3E,5S,6S)-6-Methoxy-3,5-dimethyl-7-phenylhepta-1,3-dienyl]-1,5,12,19-tetramethyl-2-methylidene-8-(2-methylpropyl)-3,6,9,13,16,20,25-heptaoxo-1,4,7,10,14,17,21-heptazacyclopentacosane-11,22-dicarboxylic acid) is named for the leucine (L) and argentine (R) at the protein amino acid positions. Other exemplary microcystins are microcystin RR (named for the arginine (R) and arginine (R) at the protein amino acid positions), microcystin YR (named for the lysine (Y) and arginine (R) at the protein amino acid positions) and microcystin LA (named for the leucine (L) and alanine (A) at the protein amino acid positions). Microcystins are chemically stable over a wide range of pH and temperatures.

Microcystins are produced by members of the genera *Microcystis*, for example, *Microcystis aeruginosa*, as well as the genera *Anabaena, Fischerella, Gloeotrichia, Nodularia, Nostoc, Oscillatoria*, and *Planktothrix*. The principal microcystin target organ is the liver. Microcystin exposure can result in liver inflammation and hemorrhage. Microcystins are also skin, eye, and throat irritants.

Exemplary alkaloid cyanotoxins include anatoxins (anatoxin-a and anatoxin-a(S)), cylindrospermopsin, saxitoxin, and lipopolysaccharides. Cylindrospermopsin is produced by *Cylindrospermopsis raciborskii* (*C. raciborskii*), *Aphanizomenon flos-aquae, Aphanizomenon gracile, Aphanizomenon ovalisporum, Umezakia natans, Anabaena bergii, Anabaena lapponica, Anabaena planctonica, Lyngbya wollei, Rhaphidiopsis curvata*, and *Rhaphidiopsis mediterranea*. Principal target organs of cylindrospermopsin are the liver and kidney. Anatoxins are produced by the cyanobacterial genera *Chrysosporum (Aphanizomenon) ovalisporum, Cuspidothrix, Cylindrospermopsis, Cylindrospermum, Dolichospermum, Microcystis, Oscillatoria, Planktothrix, Phormidium, Anabaena flos-aquae, A. lemmermannii Raphidiopsis mediterranea* (strain of *Cylindrospermopsis raciborskii*), *Tychonema* and *Woronichinia*. Saxitoxins are produced by freshwater cyanobacteria including *Aphanizomenon flos-aquae, Anabaena circinalis, Lyngbya wollei, Planktothrix* spp. and a Brazilian isolate of *C. raciborskii*.

Exemplary polyketide cyanotoxins include aplysiatoxins. Aplysiatoxins are produced by the genera *Lyngbya, Schizothrix, Planktothrix (Oscillatoria)*. Exemplary amino acid cyanotoxins include beta-methyl amino-L-alanine (BMMA). BMMA is a neurotoxin.

Levels of cyanotoxins in water sources can vary depending upon environmental conditions, the time of year, the location, and the particular cyanotoxin. Microcystin levels in raw water have been reported to range from 0.05 ug/L more than 150,000 ug/L. Public health agencies in the U.S. and elsewhere have set guidelines for levels of various cyanotoxins in drinking water. For example, the WHO has established a provisional guideline of 1 ug/L for microcystin-LR in drinking water.

The cyanotoxin-contaminated water can be contacted with an electrochemical cell, also referred to as an electrolytic cell. The electrochemical cell can be an undivided cell. The electric current can be produced by a boron doped diamond electrode (BDD) or other anode or cathode materials capable of obtaining similar current densities. Boron-doped diamond (BDD) electrodes have sufficient potential and current to generate hydroxyl radicals at nearly 100% efficiency. A cell having a BDD electrode for both the anode and cathode permits reversal of the polarization of the cell in order to remove the calcareous deposits that accumulate during use. In some embodiments, the electrochemical cell can be a divided cell.

In some embodiments, the cell can be an undivided cell having a niobium sheet coated with BDD as the anode and a stainless steel metal grid as the cathode. In some embodiments, the electrolytic cell can be provided by EUT (EUT, Eilenburger Elektrolyse-und Umwelttechnik GmbH, Eilenberg, Germany).

An exemplary system for carrying out the method of the claims is shown in FIG. 2. The system provides an undivided electrolytic cell 1 comprising a boron-doped diamond electrode serving as an anode 2 and a boron-doped diamond electrode serving as a cathode 3. The undivided electrolytic cell 1 is connected to a power supply 4. Source water from a water supply 5 is subjected to additive introduction 6, for example, the introduction of a magnesium salt, and then is circulated through the electrolytic cell presence of an electric current. After exiting the electrolytic cell 1, the treated water is passed to a collector 7.

The current density can vary depending upon the specific cyanotoxin. For example, the current density can be from about 0.5 $mA/cm^2$ to about 1000 $mA/cm^2$. In some embodiments the current density can be from about 0.5 $mA/cm^2$ to about 100 $mA/cm^2$. Exemplary current densities include 2, 5, 10, 15, 20, 25, 30, 35, 36, 37, 38, 39, 40, 41, 42, 43, 44, 45, 46, 47, 48, 49, 50, 55, 60, 65, 70, 75, 76, 77, 78, 79, 80, 81, 82, 83, 84, 85, 86, 87, 88, 89, 90, 95 or 100 $mA/cm^2$.

The contacting time can also vary. For example the contacting time can be from about two minutes to about 180 minutes. Exemplary contacting times can include about 30 seconds, about 60 seconds, about 120 seconds, about 3 minutes, about 5 minutes, about 10 minutes, about 15 minutes, about 20 minutes, about 25 minutes, about 30 minutes, about 35 minutes, about 40 minutes, about 45 minutes, about 50 minutes, about 55 minutes, about 60 minutes, about 65 minutes, about 70 minutes, about 80 minutes, about 90 minutes, about 120 minutes, about 180 minutes, about 210 minutes, about 240 minutes, or about 300 minutes.

The magnesium salt can be magnesium sulfate, magnesium chloride, magnesium phosphate, magnesium carbonate, magnesium bicarbonate, and magnesium citrate. The concentration of the magnesium salt can vary, for example from about one ppm to about 1000 ppm. Exemplary magnesium salt concentrations include about 0.5 ppm, about 1 ppm, about 2 ppm, about 5 ppm, about 10 ppm, about 15 ppm, about 20 ppm, about 25 ppm, about 50 ppm, about 75 ppm, about 100 ppm, about 125 ppm, about 150 ppm, about 175 ppm, about 200 ppm, about 300 ppm, about 400 ppm, about 500 ppm, about 600 ppm, about 700 ppm, about 800 ppm, about 900 ppm, about 1000 ppm, about 1500 ppm, about 2000 ppm, about 2500 ppm, or about 3000 ppm.

In general, the water to be treated can be contacted with the electrochemical cell in the presence of the magnesium salt at a current density and for a time sufficient to oxidize the cyanotoxin. The treatment can result in a decrease in the level of the cyanotoxin in the water. The decrease can be sufficient to reduce the level of the cyanotoxin to render the water safe for exposure to humans and animals in accord with regulatory guidelines. Microcystins contain an unusual non-proteogenic amino acid (2S, 3S, 8S, 9S)-3-amino-9-methoxy-2,6,8-trimethyl-10-phenyldeca-4,6-dienoci acid (ADDA). The ADDA moiety, which is present in all congeners, is critical to the microcystin activity and toxicity. Oxidation of the ADDA moiety substantially reduces microcystin toxicity.

Levels of cyanotoxin, for example, microcystins, in the water to be treated can vary widely, for example from about from about 0.5 μg/L to about 1 g/L. Exemplary cyanotoxin concentrations, for example, microcystin concentrations, can be about 0.5 μg/L, about 1.0 μg/L, about 5.0 μg/L, about 10.0 μg/L, about 20.0 μg/L, about 50.0 μg/L, about 100 μg/L, about 200 μg/L, about 500 μg/L, about 1000 μg/L, about 2000 μg/L, about 5000 μg/L, about 10,000 μg/L, about 20,000 μg/L, about 50,000 μg/L, about 100,000 μg/L, about 200,000 μg/L. about 500,000 μg/L or about 1 g/L.

Levels of cyanotoxin can be determined using immunoassays, for example, ELISA assays. Alternatively or in addition, levels of cyanotoxins can be determined using receptor binding assays. Chromatographic methods can also be used, for example gas chromatography mass spectrometry (GC/MS), liquid chromatography/ultraviolet-visible detection (LC/UV or LC/PDA), liquid chromatography combined with mass spectrometry, for example, liquid chromatography ion trap mass spectrometry (LC/IT MS), liquid chromatography time-of-flight mass spectrometry (LC/TOF MS), liquid chromatography single quadrupole mass spectrometry (LC/MS), or liquid chromatography triple quadrupole mass spectrometry (LC/MS/MS).

In some embodiments, the water to be treated can be subjected to pretreatment, for example, a filtration step to remove particulate matter before transit into the electrochemical cell. Following electrochemical oxidation, the treated water can then be processed using standard water purification methods, including filtration, passage through settling tanks, and chlorination or other disinfection methods.

EXAMPLES

Example 1: Electrochemical Oxidation of Microcystin-LR (MC-LR)

A stock MC-LR solution was prepared in a 5 mL screw-capped vial containing 100 μg of MC-LR (≥95%, Enzo Life Sciences, Farmingdale, N.Y., USA). The MC-LR was dissolved in the vial by the addition of 4 mL of methanol (Honeywell B&J brand for purge and trap GC analysis, VWR, Radnor, Pa., USA). This stock solution was stored at −4° C. until use. A spiked solution containing MC-LR was prepared by adding the appropriate amount of amount of stock solution to 2 L of fresh water obtained from Lake Erie in a 4 L glass beaker to a final concentration of 6 μg/L MC-LR. Electrochemical oxidation was carried out in a batch reactor with a single undivided electrolytic cell provided by EUT (EUT, Eilenburger Elektrolyse-und Umwelttechnik GmbH, Eilenberg, Germany) connected to a power meter with a maximum voltage setting of 25V. The cell was made up of a niobium sheet coated with boron-doped diamond (BDD) as the anode and a stainless-steel metal grid as the cathode. Both electrodes had a 30 cm$^2$ surface area. The contaminated water was circulated through the cell at a flow rate of 1 L/min using a MasterFlex L/S peristaltic pump (Cole-Parmer, Vernon Hills, Ill., USA). MC-LR was measured in lab using Source Drinking Water with QuikLyse™ Feature test strips (Abraxis, Warminster, Pa., USA). The immunochromatographic results were confirmed by LC/MS/MS (Greenwater Labs, Palatka, Fla., USA—Modification of Foss and Aubel method)

Aliquots of the MC-LR-spiked water were removed at intervals and MC-LR levels were measured in the aliquots. The results, presented as a percentage of the initial MC-LR remaining, are shown in Table 1. As indicated in Table 1, the MC-LR concentration was reduced to background levels by 60 minutes of electrochemical oxidation.

TABLE 1

Electrochemical Oxidation of MC-LR

| Time (min) | Current Density (mA/cm$^2$) | MC-LR (% Remaining) |
| --- | --- | --- |
| 0 | — | 100 |
| 15 | 48 | 88 |
| 20 | 47 | 51 |
| 45 | 45 | 43 |
| 60 | 44 | 0 |

Example 2: Effect of MgSO$_4$ on Electrochemical Oxidation of Microcystin-LR (MC-LR)

A spiked solution containing MC-LR was prepared as described in Example 1. MgSO$_4$ (Sigma-Aldrich, St. Louis, Mo., USA) was added to the MC-LR solution to a final concentration of 300 mg/L (2.6 mM). Electrochemical oxidation was carried out as described in Example 1. Aliquots of the MC-LR/MgSO$_4$ were removed at intervals and the MC-LR levels were determined as described in Example 1. The results, presented as a percentage of the initial MC-LR remaining, are shown in Table 2. As indicated in Table 2, the MC-LR concentration was reduced almost to background levels by 14 minutes of electrolytic oxidation.

TABLE 2

Electrochemical oxidation of MC-LR in the presence of MgSO$_4$

| Time (min) | Current Density (mA/cm$^2$) | MC-LR (% Remaining) |
| --- | --- | --- |
| 0 | — | 100 |
| 2 | 82 | 93 |
| 4 | 82 | 91 |
| 6 | 83 | 83 |
| 8 | 82 | 81 |
| 10 | 82 | 69 |
| 12 | 83 | 53 |
| 14 | 81 | 3 |

A comparison between MC-LR destruction rates in the presence and absence of MgSO$_4$ is shown in FIG. 1. As indicated in FIG. 1, the addition of MgSO$_4$ to the electrochemical oxidation reaction substantially accelerated the destruction of MC-LR.

What is claimed is:

1. A method of reducing the level of a cyanotoxin in cyanotoxin-contaminated fresh water by oxidation, wherein the water is selected from the group consisting of: lake water; reservoir water; pond water; river water; irrigation water; and drinking water; the method consisting essentially of:
    a) contacting the water with an electrochemical cell in the presence of a magnesium salt that has been added to the cyanotoxin-contaminated water, wherein: i) the concentration of the magnesium salt is from about 1 ppm to about 400 ppm; and ii) selected from the group consisting of: magnesium sulfate; magnesium phosphate; magnesium carbonate; magnesium bicarbonate; and magnesium citrate: and
    b) applying an electrical current to the water at a current density and for a time sufficient to reduce the levels of cyanotoxin by at least 80%;
    wherein the cyanotoxin is selected from the group consisting of: microcystins, nodularins, anatoxin-a, anatoxin-a(S), cylindrospermopsins, lyngbyatoxin, saxitoxin, lipopolysaccharides, aplysiatoxins, and β-methylamino-L-alanine.

2. The method of claim 1, wherein the microcystin is microcystin-LR, microcystin-LA, microcystin-RR, microcystin-YR or a combination thereof.

3. The method of claim 1, wherein the cyanotoxin level in the water is from about 0.5 µg/L to about 1 g/L.

4. The method of claim 1, wherein the electrochemical cell is an undivided cell.

5. The method of claim 4, wherein the electrochemical cell comprises one or more boron-doped diamond electrodes.

6. The method of claim 1, wherein the concentration of the magnesium salt is from about 1 ppm to about 300 ppm.

7. The method of claim 1, wherein the concentration of the magnesium salt is from about 100 ppm to about 300 ppm.

8. The method of claim 1 wherein the current density is from about 0.5 mA/cm$^2$ to about 1000 mA/cm$^2$.

9. The method of claim 4 wherein the current density is from about 0.5 mA/cm$^2$ to about 100 mA/cm$^2$.

10. The method of claim 1, wherein the time is from about two minutes to about 180 minutes.

11. The method of claim 1, wherein the cyanotoxin concentration in the cyanotoxin contaminated water is from about 1 µg/L to about 200,000 µg/L.

12. The method of claim 1 wherein the current is applied at a temperature between about 1° C. to about 100° C.

13. The method of claim 1 wherein the current is applied at a temperature between about 10° C. to about 55° C.

14. The method of claim 10, wherein the current density is from about 0.5 mA/cm$^2$ to about 1000 mA/cm$^2$.

15. The method of claim 14 wherein the current is applied at a temperature between about 1° C. to about 100° C.

16. The method of claim 15, wherein the electrolytic cell comprises a boron doped diamond electrode serving as an anode and a boron-doped diamond electrode serving as a cathode.

17. The method of claim 16, wherein the cyanotoxin is a microcystin.

18. The method of claim 16, wherein the microcystin is microcystin-LR, microcystin-LA, microcystin-RR, microcystin-YR or a combination thereof.

19. The method of claim 17, wherein the cyanotoxin level in the water is from about 0.5 µg/L to about 1 g/L.

20. The method of claim 19, wherein the concentration of the magnesium salt is from about 100 ppm to about 300 ppm.

\* \* \* \* \*